United States Patent
Castronovo

[19]

[11] Patent Number: 5,246,675
[45] Date of Patent: Sep. 21, 1993

[54] CONCEALED FUMIGATION APPARATUS

[76] Inventor: Anthony Castronovo, 2851 NW. 88th Ter., Coral Springs, Fla. 33065

[21] Appl. No.: 772,071

[22] Filed: Oct. 7, 1991

[51] Int. Cl.⁵ .................. B05B 15/06; B05D 83/00; B05D 83/14; A01M 13/00
[52] U.S. Cl. .................. 422/305; 222/180; 222/181; 222/182; 222/402.14; 222/325; 239/282; 43/125; 43/900
[58] Field of Search .......... 422/305; 222/180, 181, 222/182, 402.13, 402.14, 538, 575, 402.17, 325, 183; 239/282, 273, 274; 43/125, 127, 129, 900

[56] References Cited

U.S. PATENT DOCUMENTS

| | | | |
|---|---|---|---|
| 2,460,554 | 2/1949 | Vogel | 239/282 |
| 3,534,890 | 10/1960 | Iannacone | 222/402.14 |
| 3,625,433 | 11/1969 | Moss | 239/282 X |
| 3,934,761 | 1/1976 | Gentreau | 222/183 |

Primary Examiner—Robert J. Warden
Assistant Examiner—Stephanie Smith
Attorney, Agent, or Firm—Malin, Haley, DiMaggio & Crosby

[57] ABSTRACT

A housing for disposition of a conventional aerosol fogger having an upright spraying mechanism wherein the housing securely maintains the aerosol fogger perpendicular to a mounting surface such as a wall or ceiling. The apparatus employs a housing having an elongated cylindrical chamber for slidably insertion of the fogger canister. Upon insertion, an end cap is used to seal the chamber opening and further force the canister into a predetermined position within the chamber. Opposite the frontal opening, the chamber terminates in a end wall having a centrally disposed aperture designed to allow protrusion of the fogger's dispersion nozzle further engaging a trigger mechanism of said dispersion nozzle thereby causing expulsion of fogger canister contents though said end wall aperture.

16 Claims, 4 Drawing Sheets

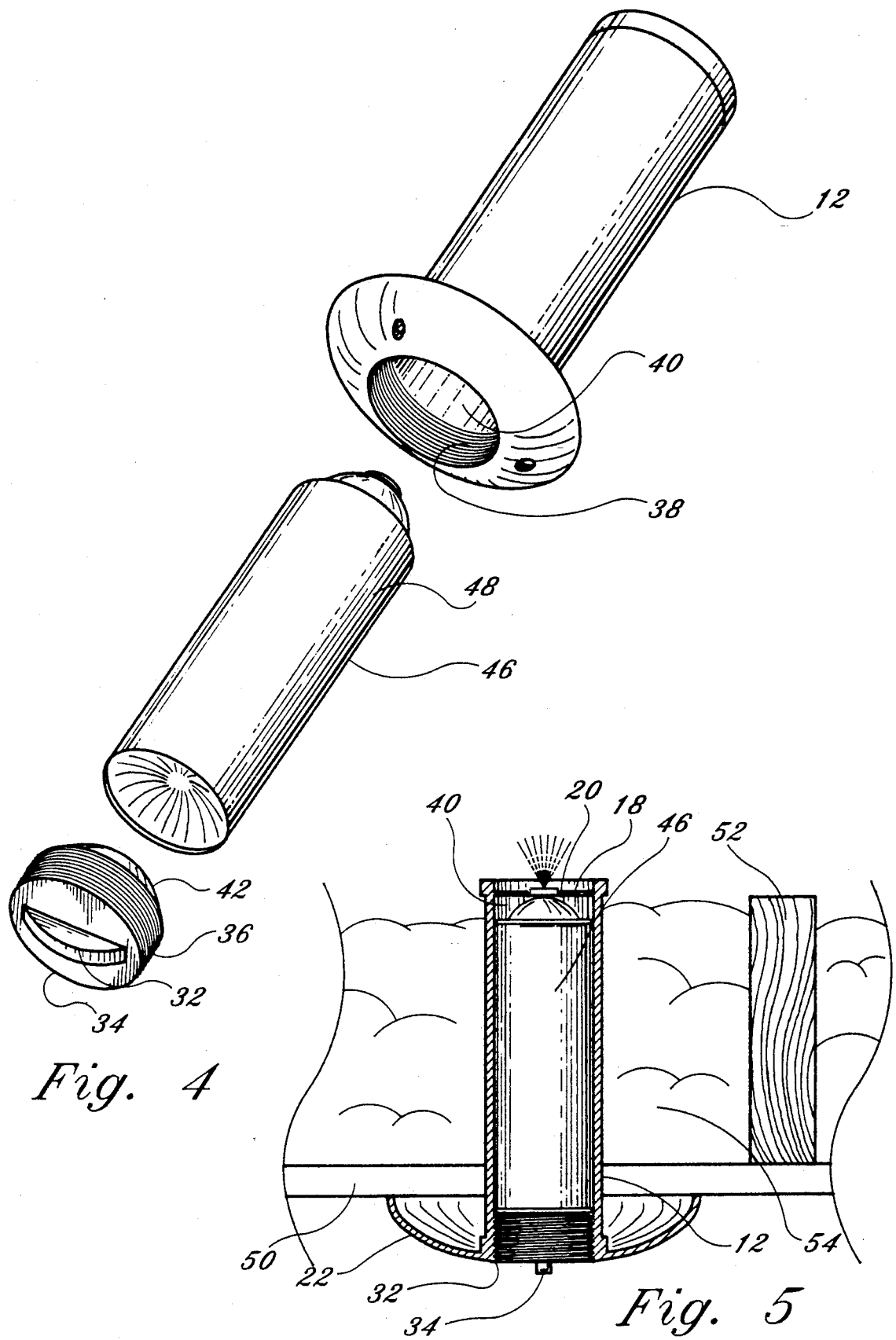

CONCEALED FUMIGATION APPARATUS

FIELD OF THE INVENTION

This invention relates generally to a means for exterminating insects in a building, and, more particular, to an aesthetically pleasing and functionally operative apparatus having a clandestine chamber for placement of a disposable aerosol insecticide spraying canister whereby mounting of the apparatus in a wall or ceiling permits extermination of insects in the cavity formed therefrom.

BACKGROUND OF THE INVENTION

Insects can be annoying pests when they take up residence in an inhabited building such as a home or office building. Many insects, such as flies, mosquitoes, roaches, moths, beetles, aphids, mites, ants, and so forth, are capable of disease transmission making this annoyance untolerable. To rid a building of such insects, it is well known that properly applied insecticide will eliminate an infestation and periodic application can prevent a repeat infestation.

It is also known that insecticide can be harmful to humans if improperly applied. Entrepreneurs have recognized this fact and built a large service industry oriented toward extermination of insects. Typically a single application of insecticide by a professional service organization will eliminate a large variety of known insects and new infestations repelled as long as a residual remains. However, problems associated with commercially applied chemicals include: the expense of paying for an outside service organization to treat a building, inconvenience of having to plan a schedule around an outside service organization, apprehension whether the service organization is applying chemicals of appropriate strength, and apprehension whenever a stranger is allowed into a private building.

Many homeowners do not employ the use of an outside service organization for one reason or another, instead relying upon commercially available insecticide products. These products are available in form of sprays, poisons, traps, aerosol canisters, and so forth. Each product taunted as the most effective according to the individual manufacturer. If applied according to instructions, most products are safe to use and just as effective as those professionally applied.

Whether an insecticide is applied professionally or by the homeowner, the most important aspect of the application is placement of chemical. For instance, a private home treatment may include spraying the interior and exterior baseboards and periodically treating the volume of the home by use of an ambient fogging device. A fogging device is a pressurized canister of insecticide that, when a releasing mechanism is engaged, atomizes a tiny jet of liquid in a venturi tube through which passes an ultra high velocity air stream. The air stream distributing the liquid throughout a room encompassing areas that sprays may not be able to reach. The fogging type device is arguably the most effective method in treating a volume of space. This is performed without the need for supervision as long as the fogger is maintained in a fixed position.

Despite the convenience of a fogger, the fogger is based on a petroleum product designed to encompass a particular square footage of area. A major problem with the fogger application is figuring out the square footage of a room, especially a room such as an attic whose ceiling is the underside of an angular roof. The result is a guess-estimate for placement of the fogger. However, if foggers are placed too far apart, the concentration will be insufficient to eliminate the insects. If foggers are placed too close to each other, a high concentration may result in an explosion triggered by conventional home appliances such as the gas pilot light of a dryer, stove, furnace, or even the inopportune spark such as a blown light bulb. Entire homes are known to be destroyed by the high concentration of fogger gas. Further, a fogger on furniture or carpeting causing permanent discoloration.

Yet another disadvantage to the use of either the sprayer or fogger is that neither is capable of penetrating walls or ceilings areas that are most likely to have the insect infestation. Insects in these areas are simply trapped in the cavity until the residual "barrier" dissipates allowing the insect to resume its normal activities.

Due to this situation, a chemical application must include those hidden areas such as the spaces between walls or in the ceilings if the application is to be successful. One method of treating a building is by enclosing it within a gas impermeable tent and injecting gas into the tent, a project best left for professionals. Another method is for the chemical applicator to crawl into the ceiling area and fog the area. A number of homes do not have direct access to the ceiling making this impractical if not impossible. Further, placement of a fogger within the attic requires the operator to quickly exit to avoid inhaling the gas while being careful not to disturb the insulation or fall through the ceiling.

One device addressing the problem of treating the wall cavity in home is addressed in U.S. Pat. No. 4,823,505 issued to Jackson. Jackson teaches a device utilizing a tapered aperture placed in a wall allowing chemical to be injection into the wall cavity. The device employs a tapered fumigant injection nozzle that is installed on a fogger and pressed into a corresponding aperture in the wall allowing the fog to enter the wall cavity. The drawback of such a device is that it requires the operator to hold the fogger container during the application thus limiting its application.

Another device addressing this problem is U.S. Pat. No. 4,945,673 issued to Lavelle which teaches a method of exterminating pests in the wall cavity. Lavelle places a horizontally mounted chamber into a wall having a means for placing a pest extermination substance therein. Insect are drawn to the chamber where they consume the substance. Such a device is based upon insect being drawn to the substance and does not present a means for reaching those insects are not attracted to the substance. Further, neither device teaches a means for extermination of insects in the ceiling cavity.

Of particular concern is the treatment of building employing ceilings forming a barrier between the occupied area and the roof This area is seldom disturbed and lends itself to a possible breeding ground for disease-transmitting insects. Many insects do not live in the wall cavity of a building but prefer the darkened areas of the attic, drop ceilings, and crawl spaces. These insects use the walls as a passageway to obtain food. If spraying is limited to the wall cavity, the insect will avoid the wall cavity until the insecticide dissipates. Spraying or treating the walls will not eliminate the insects when the nest and eggs are located in the ceiling.

Heretofore, no teaching is made of a device that allows simplified fumigation of cavities such as a ceiling or wall by use of a fogging device that can be inserted from one side of the wall, forms a sealed enclosure, and maintains the fogger canister is a predetermined position. While efforts have been made to address the above shortcomings, it is to the effective resolution of these shortcomings that the concealed fumigation apparatus of the instant invention is directed.

SUMMARY OF THE INVENTION

It is the principal feature of the present invention to provide an apparatus that overcomes the shortcomings and associated problems described above by providing a concealed fumigation apparatus or device, which, when used in combination with an aerosol fogger, exterminates insects in the ceiling or the like cavity.

Generally, the apparatus can be described as a housing for disposition of a conventional aerosol fogger having an upright spraying mechanism. The housing includes a means for securely maintaining the aerosol fogger perpendicular to a mounting surface, said mounting surface being a wall or ceiling, whereby the insecticide chemical of the aerosol fogger is projected outwardly from the housing.

The housing forms a cylindrical chamber having a diameter slightly larger than the aerosol fogger allowing slidable insertion therein. A first end of the chamber is used for insertion of the fogger canister into the chamber. Upon insertion, an end cap is used to seal the chamber and further force the canister into a pre-determined position within the chamber.

Opposite the first end is a centrally disposed aperture on the end wall of the chamber designed to allow protrusion of the fogger spray nozzle from the end of the chamber. The aperture sized accordingly so as to engage the fogger spray release mechanism.

Mounting the apparatus requires a wall or ceiling cutout for insertion of the housing therethrough whereby the totality of the housing is disposed in the cavity of the wall or ceiling. The preferred embodiment employs screws or nails to secure a lip of the housing to the surface of the wall or ceiling thereby fixturing the device to the surface. Only the lip and chamber cap protrude from the wall making the mount nearly flush with the surface.

To operate the apparatus, the end cap of a mounted is removed and a canister placed with the chamber. The end cap is replaced which forces the canister against the aperture opening of the end wall. The spray nozzle of the canister is positioned within the aperture and, the spray release mechanism engaged with the end wall allowing the fogger canister to release its contents.

Therefore, it is an object of the instant invention to provide an apparatus that provides a fixed structure for holding of aerosol insecticides such as "foggers" at predetermined locations allowing for the safe dispersion of a spray propellant insecticide.

Yet another object of the instant invention is to allow an operator to engage a fogger in the cavity of a wall or ceiling by use of a sealable chamber without the necessity of entering the cavity.

Still another object is to provide a means rigidly securing a fogging device in a movable environment such as a camper or boat. The camper can be fogged while in transit, the boat can be fogged while in the water.

Another object of the instant invention is to provide an astetically pleasing housing structure having a small external lip for mounting and decorative end cap that can be installed in such a manner as to blend with a room decor.

Yet another object is to provide a means for exterminating known areas of insect infestation without requiring the evacuation of human inhabitants. Yet still another object of the instant invention is the use of a variety of chamber cap sealing means including: a threaded chamber cap aesthetically securing the cap to the housing having a corresponding threaded interior chamber; alternatively a chamber cap having a plurality of depressable ball bearings for releasably securing the cap to the housing having a plurality of corresponding ball bearing detents; still another alternative is a chamber cap attached to the housing by a tongue and groove locking means made operative by tongue retraction on the end of the cap operatively associated with a groove located on the housing, the locking means operated by a lever or squeezable handle.

Still another object is to make the end cap a centering device by use of a concave end formed to fit the concave end of conventional aerosol foggers.

Still another object is to provide an oversize housing allowing various fogger canister lengths for extension through unusually thick walls or insulation beds by use of a spacer means placed between the end cap and the canister.

Other and further objects, features, and advantages of the invention will become evident upon the reading of the following specification taken in conjunction with the drawing.

BRIEF DESCRIPTION OF THE DRAWINGS

The invention will be more readily understood with reference to the accompanying drawings, wherein:

FIG. 4 is an exploded view of the apparatus illustrating the chamber cap, fogger canister, and housing;

FIG. 5 is a cross-sectional view of the apparatus mounted in a typically ceiling;

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure. The aims and objects of the invention are accomplished by providing a device that allows the use of a conventional fogger canister to be installed from one side of a wall for the extermination of insects on the opposite side of the wall.

Figure 1:
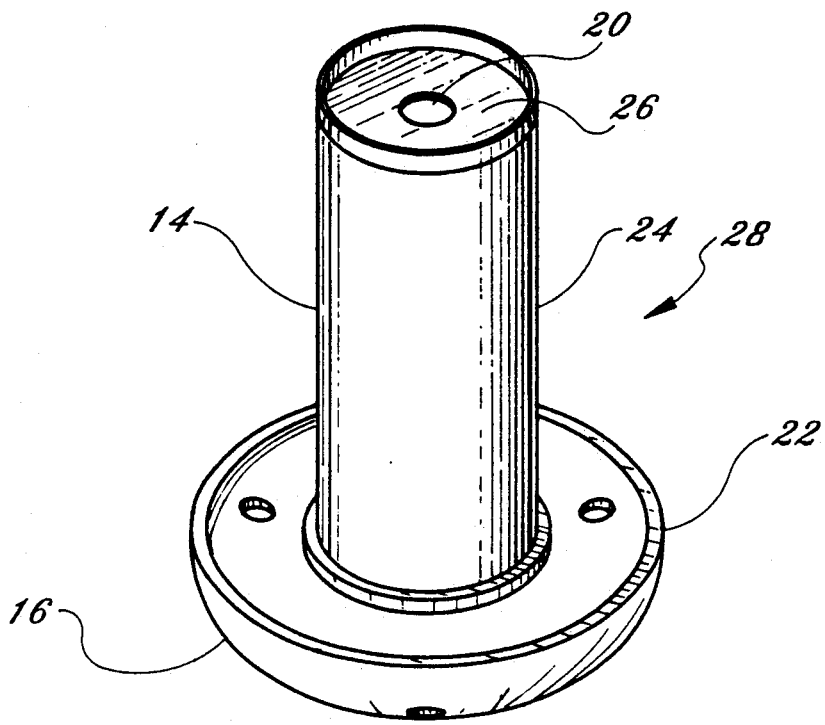
FIG. 1 is a prospective view illustrating the housing, end aperture, and bottom portion of the mounting lip.

Referring to the drawings in more detail, and more particularly to FIG. 1, there is shown a preferred embodiment of my concealed fumigation apparatus generally characterized by the reference numeral 10. Housing enclosure 12 is a substantially cylindrical enclosure defined by curved side wall 14, front end 16 and antipode end wall 18. End wall 18 includes aperture 20 centrally located between curved side wall 14. Mounting lip 22 encompasses the housing 12 juxtapose to front end 16. In order to facilitate manufacture and assembly, housing 12 may be fabricated with either mounting lip 22 being separate components attachable to side wall 14, alternatively, housing 12 and mounting lip 22 can be constructed from a single piece of material. Housing 12 and lip 22 may be fabricated from fiberglass, plastic, or metal. The preferred material is one which is light in weight and remains structurally rigid in adverse temperatures associated with ceiling cavities, yet of a structure having a frontal area that can be painted or color pigmented allowing for an aesthetically pleasing exposed frontal portion. Accordingly, housing 12 can be made from one type of material and the mounting lip 22 of another material as the mounting lip and associated chamber cap is the only portion viewed by the consumer.

Figure 2:
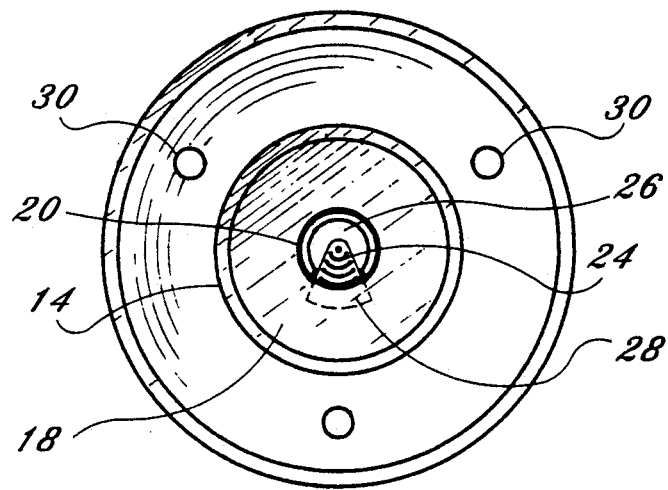
FIG. 2 is an end view showing the bottom portion of the mounting lip, the end and end aperture with fogger canister mounted within the structure.
Figure 3:
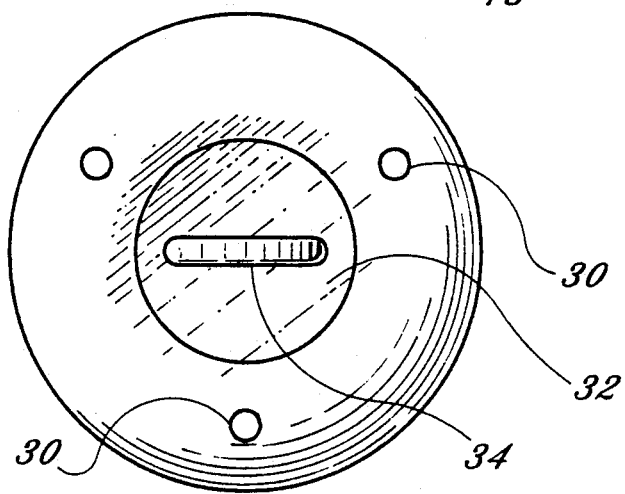
FIG. 3 is a front view of the apparatus with the chamber cap installed.

FIG. 2 illustrates end wall 18 having aperture 20 sized to permit protrusion of fogger spray nozzle 24 including fogger spray nozzle support 26. Protrusion of spray nozzle support 26 through aperture 20 engages dispersion toggle depressed by inner surface of end wall 18. An "O" ring, not shown, can be placed around the nozzle to seal the canister to the end wall. Mounting lip 22 includes a plurality of mounting holes, preferably three mounting holes 30 allowing adequate support. The front view of the housing shown in FIG. 3 further illustrates mounting lip 22 with chamber cap 32 releasably attached to mounting lip 22. The chamber cap 32 sealably enclosing a hollow chamber, described hereafter, formed by the inner surface of curved wall 14. In this embodiment, the chamber cap 32 engages the chamber surface through the use of threads allowing chamber cap 32 to thread onto corresponding treads located in the chamber surface. Rotation of chamber cap 32 without tools is made possible by finger grip raised portion 34. Alternatively, a slot, not shown, could be placed the chamber cap 32 in place of raised portion 34 requiring a flat head screwdriver for rotational engagement. Accordingly, any type of tool and associated with tool slot could be used such as a hex head, Phillips head, socket head, and so forth.

FIG. 4 portrays an exploded view showing end cap 32 with raised portion 34 encompassed by threaded portion 36 made engagable to threaded portion 38 of chamber 40. A convex dome 42 can be placed on, or formed out of, the end of chamber cap 32 allowing a centering means to accommodate the concave portion 44 of a conventional fogger canister 46. The chamber 40 having a internal diameter sized to accommodate the external surface 48 of the conventional fogger canister 46.

FIG. 5 illustrates the apparatus as mounted in a ceiling wherein lip 22 is secured to ceiling surface 50 maintaining housing surface 12 perpendicular to the surface and parallel to ceiling support joist 52. The housing 12 extends through the ceiling insulation allowing the end wall 18 to remain unobstructed to the remaining portion of the ceiling cavity. Placement of fogger canister 46 within cavity 40 forces the spray nozzle through aperture 20 by screwing end cap 32 into said housing 12 by rotating end cap 32 by end cap handle 34.

Figure 6:
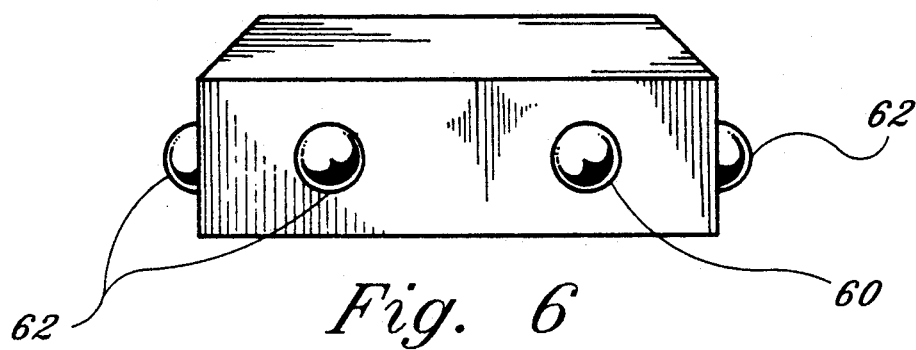
FIG. 6 is an alternative embodiment of the chamber cap employing depressable ball bearings.
Figure 7:
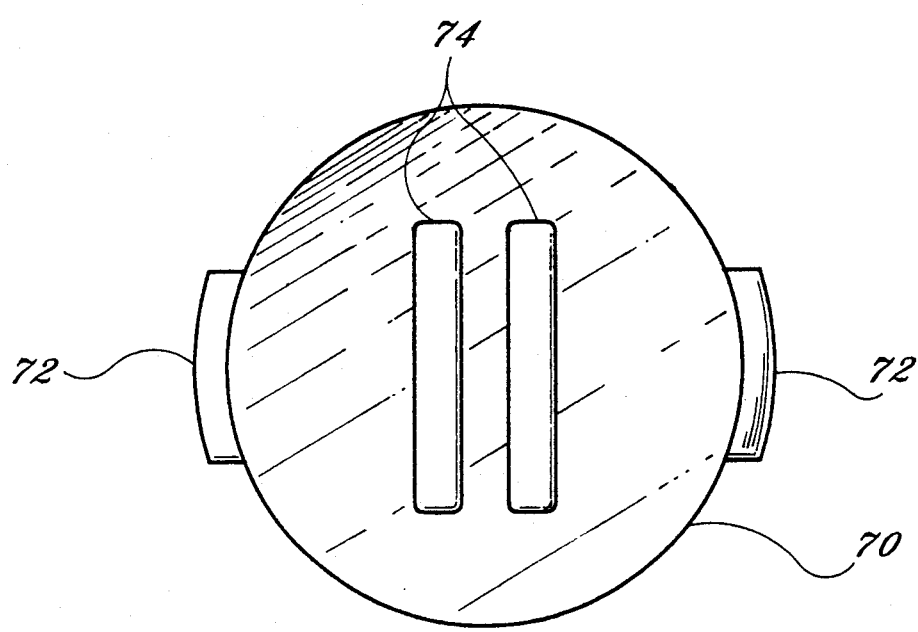
FIG. 7 is an alternative embodiment of the chamber cap employing a depressable tongue.
Figure 8:
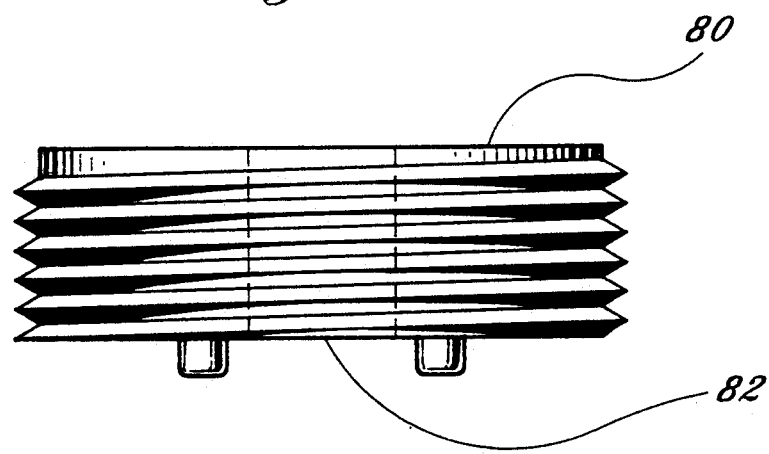
FIG. 8 is an alternative embodiment of the chamber cap allowing fogger spray dispersion therethrough.

FIGS. 6, 7 and 8 present alternative embodiments of the chamber cap. In a first embodiment end cap 60 employs a plurality of depressable ball bearings 62 placed along the outer periperhy 64 operatively associated with ball bearing detents of the chamber, not shown. In a second embodiment end cap 70 employs a depressable tongue 72 controllable by handle 74 operatively associated with grooves of the chamber, not shown. In a third embodiment end cap 80 has an aperture 82 wherein a canister can be placed upside down allowing dispersion of fogger spray through end cap. The triggering means set forth is in a similar manner as end wall triggering means.

Figure 9:
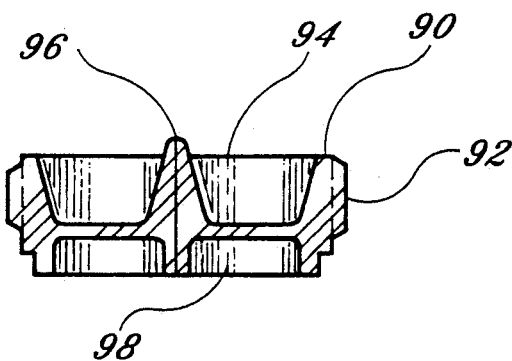
FIG. 9 is a cross sectional side view of a typical embodiment of the chamber cap illustrating dimensions.
Figure 10:
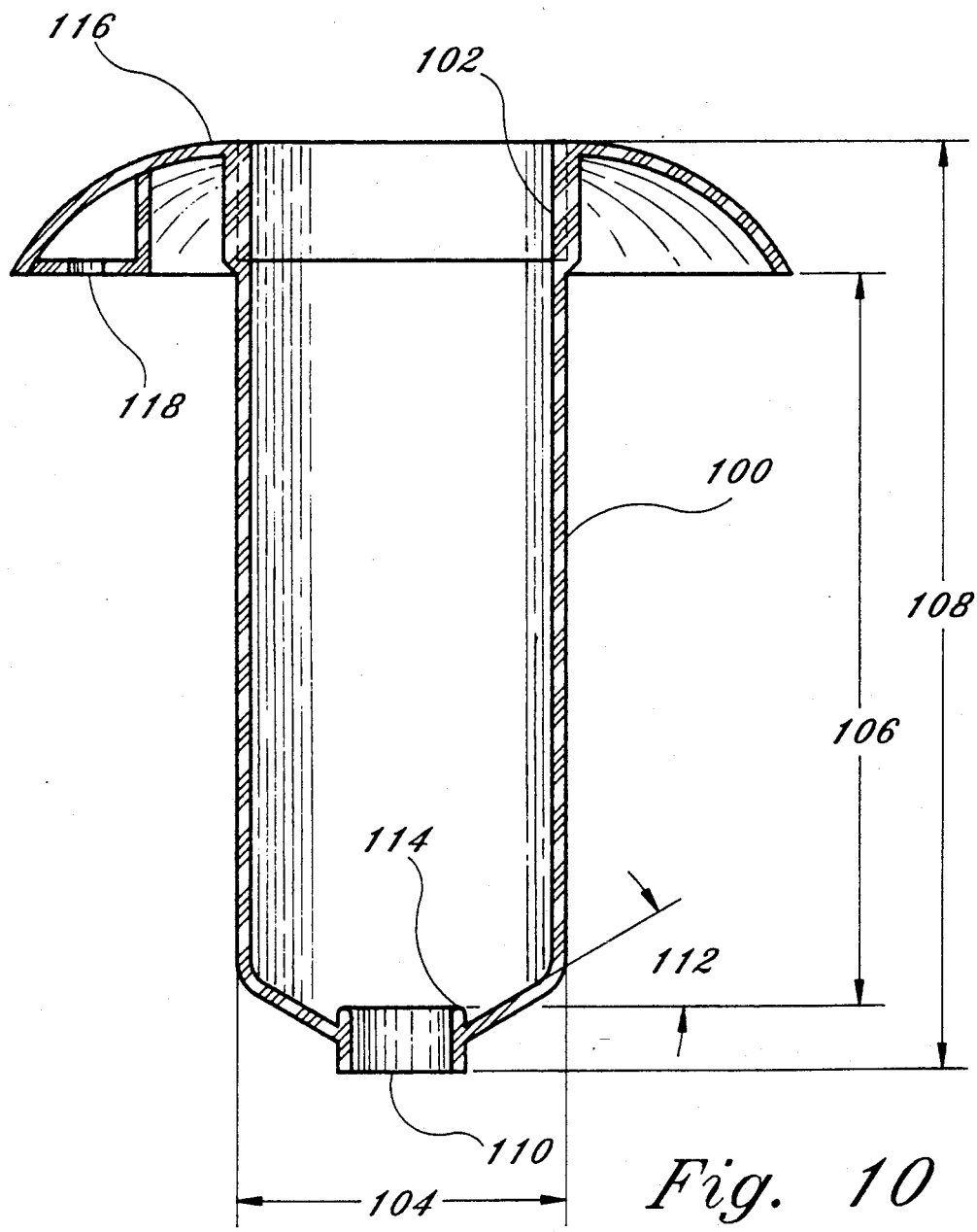
FIG. 10 is a cross sectional view of a typical embodiment of a one piece chamber housing illustrating dimensions and a funnel shaped triggering lip.

FIGS. 9 and 10 is a cross sectional side view of a chamber cap 90 and single piece chamber housing 100 constructed of high impact styrene. A typical dimensional setup includes end cap 90 having an outer diameter 92 of between 1 inch and 4 inches, as shown in this alternate embodiment, 2⅜ inches threaded to 12 UN-2A. Material is removed from the cap 90 leaving voids 94 lessening the weight of the cap and creating finger grip section 96 allowing cap rotation by human hand. Housing enclosure 100 includes a corresponding engagement inner diameter 102 of 2⅜ inches threaded to 12 UN-2B. The inner diameter 104 for housing the canister per this embodiment is 2.20 inches, canister operating length 106 is 6.195 inches, canister overall length 108 is 6.725 inches. Shown is an canister engagement aperture 110 having inclined wall 112 set at 30 degrees to direct a canister to the aperture 110. Raised lip 114 allows engagement of both conventional leverage arm fogger canisters and fogger canisters having a circular engagement means. The expulsion of the fogger is though aperture 110. The lip 116 is shown integral with housing 100 cast from the same mold with a plurality of reinforced mounting hole 118 located therein.

It will be apparent that modifications in accordance with the present invention can be made by those skilled in the art without departing from the spirit thereof and it is equally apparent that the apparatus can be of a variety of sizes having the above described functionality. It will be obvious to those skilled in the art that various changes may be made without departing from the scope of the invention and the invention is not to be considered limited to what is shown in the drawings and described in the specification.

What I claim as new and desire to secure by Letters Patent of the United States is:

1. A concealed fumigation apparatus for holding a conventional fumigation canister in a wall or ceiling, said fumigation apparatus comprising: an elongated cylindrical housing having a curved side wall of a nominal thickness defined by an outer surface and an inner surface, said inner surface of said housing forming an interior chamber therein with a sealable frontal opening and a distal end wall, said end wall having a centrally disposed aperture with a shoulder for locking an offset actuating valve on a conventional fumigation canister having a centrally located dispersion nozzle; a means for mounting said housing to the exterior surface of a wall or ceiling; a flush mounted chamber cap having an outer periphery operatively associated with said inner surface of said housing; and, a means for releasably securing said chamber cap to said housing; wherein a conventional fogger canister having a centrally located dispersion nozzle is slidably insertable through said frontal opening into said interior chamber of said housing for protrusion of said dispersion nozzle through said end wall aperture, said chamber cap sealably enclosing said fogger canister in a predetermined position within said chamber further engaging a trigger mechanism of said dispersion nozzle thereby causing expulsion of fogger canister contents through said end wall aperture for dispersion of the canister contents in the wall or ceiling cavity.

2. The fumigation apparatus recited in claim 1, wherein said means for mounting comprises a tubular section integral with said housing side wall, said tubular section defined as a lip disposed colinearly with said frontal opening of said housing.

3. The fumigation apparatus recited in claim 2, wherein said lip contains a plurality of mounting holes therethrough for placement of mounting screws permitting releasably securing of said housing to an exterior surface of a wall or ceiling.

4. The fumigation apparatus recited in claim 1, wherein said housing is plastic, fiberglass, or metal.

5. The fumigation apparatus recited in claim 1, wherein said chamber cap includes a positioning end operatively associated with a conventional fogger canister.

6. The chamber cap according to claim 5, wherein said positioning end is a convex shape.

7. The fumigation apparatus recited in claim 8, wherein the outer periphery of said chamber cap includes a plurality of depressible ball bearings for releasably securing said chamber cap to said housing having a plurality of corresponding ball bearing detents located on said inner surface.

8. The fumigation apparatus recited in claim 5, wherein said chamber cap includes tongue and groove locking means, said tongue and groove locking means operatively associated with a groove means located on said inner surface.

9. The fumigation apparatus recited in claim 5, wherein the said chamber cap is further includes an aperture for dispersion of fogger canister contents through said chamber cap.

10. The fumigation apparatus recited in claim 1, wherein the outer periphery of said chamber cap is threaded, said chamber cap further including rotational means, for releasably securing said chamber cap to said housing having a corresponding threaded inner surface.

11. The fumigation apparatus recited in claim 10, wherein said rotational means comprises a raised ridge allowing finger rotation.

12. The fumigation apparatus recited in claim 10, wherein said rotational means is a slot.

13. The fumigation apparatus recited in claim 1, wherein an "O" ring is operatively associated with said aperture of said end wall inside said interior chamber.

14. The fumigation apparatus recited in claim 1, wherein said chamber cap is plastic, fiberglass, or metal.

15. The fumigation apparatus recited in claim 1, wherein said end wall is beveled for guiding a dispersion nozzle of a conventional fogger canister into a predetermined position.

16. A concealed fumigation apparatus for holding a conventional fumigation canister in a wall or ceiling, said fumigation apparatus comprising: a plastic elongated cylindrical housing having a curved side wall of a nominal thickness forming an outer surface and an inner surface, said inner surface of said housing forming an interior chamber therein with a threaded frontal opening and a distal end wall, said end wall having a centrally disposed aperture therethrough; a lip disposed collinear with said frontal opening of said housing having a plurality of mounting holes therethrough with a shoulder for locking an offset actuating valve on a conventional fumigation canister having a centrally located dispersion nozzle; a flush mounted threaded chamber cap having an outer periphery operatively associated with said threaded frontal opening; wherein a conventional fogger canister having a centrally located dispersion nozzle is slidably insertable through said frontal opening into said interior chamber of said housing for protrusion of said dispersion nozzle through said end wall aperture, said chamber cap sealably enclosing said fogger canister in a predetermined position within said chamber further engaging a trigger mechanism of said dispersion nozzle thereby causing expulsion of fogger canister contents through said end wall aperture for dispersion of the canister contents in the wall or ceiling cavity.

* * * * *